US009460064B2

(12) United States Patent
Chandrasekar et al.

(10) Patent No.: US 9,460,064 B2
(45) Date of Patent: Oct. 4, 2016

(54) EFFICIENT PIECE-WISE UPDATES OF BINARY ENCODED XML DATA

(75) Inventors: Sivansankaran Chandrasekar, Palo Alto, CA (US); Nitin Gupta, Palo Alto, CA (US); Ravi Murthy, Fremont, CA (US); Nipun Agarwal, Santa Clara, CA (US); Eric Sedlar, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 813 days.

(21) Appl. No.: 11/437,512

(22) Filed: May 18, 2006

(65) Prior Publication Data

US 2007/0271305 A1 Nov. 22, 2007

(51) Int. Cl.
*G06F 17/00* (2006.01)
*G06F 17/24* (2006.01)
(Continued)

(52) U.S. Cl.
CPC ......... *G06F 17/24* (2013.01); *G06F 17/30917* (2013.01); *G06F 17/22* (2013.01); *G06F 17/2247* (2013.01); *G06F 17/2264* (2013.01); *G06F 17/30911* (2013.01)

(58) Field of Classification Search
CPC ............... G06F 17/22; G06F 17/2264; G06F 17/30908; G06F 17/24; G06F 17/2247; G06F 17/30911
USPC ............... 715/248, 249, 200, 234, 250, 255; 707/203, 204, 795, 797
See application file for complete search history.

(56) References Cited

U.S. PATENT DOCUMENTS

| 6,018,747 A | 1/2000 | Burns et al. |
| 6,061,697 A | 5/2000 | Nakao |
| 6,414,610 B1 | 7/2002 | Smith |

(Continued)

FOREIGN PATENT DOCUMENTS

| EP | 2040180 A1 | 3/2009 |
| WO | WO 03107576 | 12/2003 |

(Continued)

OTHER PUBLICATIONS

Ozden; A Binary Encoding for Efficient XML Processing; Dec. 17, 2002; p. 81-102.*

(Continued)

*Primary Examiner* — Cesar Paula
*Assistant Examiner* — David Faber
(74) *Attorney, Agent, or Firm* — Hickman Palermo Becker Bingham LLP; Marcel K. Bingham (57) ABSTRACT

An XML document can be represented in a compact binary form that maintains all of the features of XML data in a useable form. In response to a request for a modification (e.g., insert, delete or update a node) to an XML document that is stored in the compact binary form, a certain representation of the requested modification is computed for application directly to the binary form of the document. Thus, the requested modification is applied directly to the persistently stored binary form without constructing an object tree or materializing the XML document into a corresponding textual form. Taking into account the nature of the binary form in which the document is encoded, the bytes that actually require change are identified, including identifying where in the binary representation the corresponding actual changes need to be made.

12 Claims, 5 Drawing Sheets

(51) Int. Cl.
    *G06F 17/22*            (2006.01)
    *G06F 17/30*            (2006.01)

(56) References Cited

U.S. PATENT DOCUMENTS

| | | |
|---|---|---|
| 6,598,055 B1 | 7/2003 | Keesey et al. |
| 6,671,853 B1* | 12/2003 | Burkett et al. ............... 715/235 |
| 6,879,986 B1 | 4/2005 | Fisher |
| 6,883,137 B1 | 4/2005 | Girardot et al. |
| 6,941,510 B1 | 9/2005 | Ozzie et al. |
| 6,964,015 B2* | 11/2005 | Demopoulos et al. ....... 715/233 |
| 6,996,571 B2 | 2/2006 | McConnell |
| 7,013,425 B2 | 3/2006 | Kataoka |
| 7,031,956 B1* | 4/2006 | Lee et al. ...................... 707/3 |
| 7,080,094 B2 | 7/2006 | Dapp et al. |
| 7,090,318 B2* | 8/2006 | Brown ........................ 312/332 |
| 7,143,397 B2 | 11/2006 | Imaura |
| 7,260,580 B2* | 8/2007 | Gauweiler ........ G06F 17/30908 |
| 7,302,489 B2 | 11/2007 | Kraft |
| 7,340,673 B2 | 3/2008 | Malone |
| 7,464,082 B2* | 12/2008 | Weiss |
| 7,484,171 B2 | 1/2009 | Jeon et al. |
| 7,586,839 B2 | 9/2009 | Childress et al. |
| 7,730,104 B2 | 6/2010 | Uchiyama et al. |
| 7,774,321 B2* | 8/2010 | Tomic et al. ................. 707/690 |
| 7,779,350 B2 | 8/2010 | Bender et al. |
| 7,831,540 B2 | 11/2010 | Medi et al. |
| 7,844,632 B2 | 11/2010 | Zhou et al. |
| 7,877,356 B1 | 1/2011 | Guiheneuf et al. |
| 8,046,699 B2 | 10/2011 | Mohan et al. |
| 8,073,841 B2 | 12/2011 | Tarachandani et al. |
| 8,126,855 B2 | 2/2012 | Faerber et al. |
| 8,150,818 B2 | 4/2012 | Van Der Linden et al. |
| 8,326,810 B2 | 12/2012 | Faerber et al. |
| 2001/0037346 A1* | 11/2001 | Johnson ........................ 707/513 |
| 2002/0075514 A1 | 6/2002 | Wright et al. |
| 2002/0111965 A1 | 8/2002 | Kutter |
| 2002/0123993 A1 | 9/2002 | Chau et al. |
| 2003/0046317 A1* | 3/2003 | Cseri ................ G06F 17/218 715/234 |
| 2003/0069881 A1 | 4/2003 | Huttunen |
| 2003/0093626 A1 | 5/2003 | Fister |
| 2003/0101235 A1 | 5/2003 | Zhang |
| 2004/0060006 A1 | 3/2004 | Lindblad et al. |
| 2004/0068509 A1 | 4/2004 | Garden et al. |
| 2004/0068696 A1 | 4/2004 | Seyrat et al. |
| 2004/0143791 A1* | 7/2004 | Ito et al. ...................... 715/513 |
| 2004/0148278 A1 | 7/2004 | Milo et al. |
| 2004/0267760 A1 | 12/2004 | Brundage et al. |
| 2004/0268244 A1 | 12/2004 | Levanoni et al. |
| 2004/0268305 A1 | 12/2004 | Hogg et al. |
| 2005/0033733 A1 | 2/2005 | Shadmon et al. |
| 2005/0044113 A1 | 2/2005 | Manikutty et al. |
| 2005/0050054 A1 | 3/2005 | Clark et al. |
| 2005/0086608 A1 | 4/2005 | Roessler |
| 2005/0091188 A1 | 4/2005 | Pal et al. |
| 2005/0097084 A1 | 5/2005 | Balmin et al. |
| 2005/0108209 A1 | 5/2005 | Beyer et al. |
| 2005/0114316 A1* | 5/2005 | Fontoura et al. ................. 707/3 |
| 2005/0187973 A1 | 8/2005 | Brychell et al. |
| 2005/0228786 A1 | 10/2005 | Murthy et al. |
| 2005/0228791 A1 | 10/2005 | Thusoo et al. |
| 2005/0228828 A1 | 10/2005 | Chandrasekar et al. |
| 2005/0278289 A1* | 12/2005 | Gauweiler ........ G06F 17/30908 |
| 2005/0278616 A1 | 12/2005 | Eller |
| 2005/0289125 A1 | 12/2005 | Liu et al. |
| 2006/0021246 A1 | 2/2006 | Schulze et al. |
| 2006/0031757 A9 | 2/2006 | Vincent |
| 2006/0036631 A1* | 2/2006 | Cheslow ........... G06F 17/30914 |
| 2006/0059324 A1* | 3/2006 | Simske ............. A61B 5/04325 711/170 |
| 2006/0136508 A1 | 6/2006 | Idicula et al. |
| 2006/0143340 A1* | 6/2006 | Labar ............................ 710/62 |
| 2006/0167912 A1* | 7/2006 | Coulson et al. ............... 707/101 |
| 2006/0168513 A1 | 7/2006 | Coulson et al. |
| 2006/0195783 A1 | 8/2006 | Davis et al. |
| 2006/0212467 A1 | 9/2006 | Murthy et al. |
| 2006/0242559 A1* | 10/2006 | Krantz et al. ................. 715/513 |
| 2006/0277179 A1 | 12/2006 | Bailey |
| 2007/0044012 A1 | 2/2007 | Suver et al. |
| 2007/0067461 A1* | 3/2007 | Savchenko et al. .......... 709/227 |
| 2007/0079234 A1 | 4/2007 | McCollum et al. |
| 2008/0077606 A1 | 3/2008 | Fang et al. |
| 2008/0098001 A1 | 4/2008 | Gupta et al. |
| 2008/0098019 A1 | 4/2008 | Sthanikam et al. |
| 2008/0098020 A1 | 4/2008 | Gupta et al. |
| 2008/0098186 A1* | 4/2008 | Zhou ................ G06F 17/2247 711/159 |
| 2008/0104025 A1 | 5/2008 | Dharamshi et al. |
| 2008/0195933 A1 | 8/2008 | McKellar et al. |
| 2008/0294676 A1 | 11/2008 | Faerber et al. |
| 2009/0094236 A1 | 4/2009 | Renkes et al. |
| 2009/0141629 A1 | 6/2009 | Gerosa et al. |
| 2009/0248648 A1 | 10/2009 | Johnson et al. |
| 2012/0109910 A1 | 5/2012 | Netz et al. |
| 2013/0018853 A1 | 1/2013 | Jayaraman et al. |
| 2013/0060780 A1 | 3/2013 | Lahiri et al. |

FOREIGN PATENT DOCUMENTS

| | | |
|---|---|---|
| WO | WO 2006026534 | 3/2006 |
| WO | WO 2010/039895 | 4/2010 |

OTHER PUBLICATIONS

Ozden, Mustada; "A Binary Encoding for Efficient XML Processing", Dec. 17, 2002, Telematik , 114 pages total.*

Myer, "A Really, Really, Really Good Introduction to XML", Sitepoint, Aug. 24, 2005, 107pages.*

Arnold, Ewald, "1.9. Using the WAP Binary XML Parser", Dec. 27, 2005, The Ulxmlrpcpp Handbook, p. 1 + table of content (2 pages); 3 pages total.*

Kangasharju et al ("Xebu: A Binary Format with Schema-Based Optimizations for XML Data" , pub. Nov 20-22, 2005, pp. 528-535+4 cover pages).*

PCT/US2007/010163, Notification of Transmittal of the International Search Report and the Written Opinion of the International Searching Authority, Oct. 12, 2007, 12 pages.

Bayardo et al., "Optimizing encoding: An evaluation of binary xml encoding optimizations for fast stream based xml processing", May 2004, Proceedings of the 13th international conference on World Wide Web WWW 04', Publisher ACM press, 7 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Min et al., "XML Indexing and compression: XPRESS: a queriable compression format for XML data", Jun. 2003, Proceedings of the 2003 ACM SIGMOD international conference on Management of data SIGMOD 03', Published by ACM Press, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

U.S. Appl. No. 10/944,171, filed Sep. 16, 2004, Office Action Mailing Date Apr. 19, 2007.

Bouchou et al., "Updates and Incremental Validation of XML Documents" LNCS 2921 (2004) pp. 216-232.

Catania et al., "Lazy XML Updates: Laziness as a Virtue of Update and Structural Join Efficiency" SIGMOD (Jun. 14-16, 2005) 12 pages.

Kanne et al., "Efficient Storage of XML data" (Dec. 13, 1999) 22 pages.

(56) References Cited

OTHER PUBLICATIONS

Kim et al., "An Efficient XML Index Technique with Relative Position Coordinate" Dept. of Computer Science, Seoul, South Korea, WSEAS Transactions on Information Science and Applications, vol. 2, No. 4 (Apr. 2005) pp. 373-379.

La Fontaine et al., "A Delta Format for XML: Identifying Changes in XML Files and Representing the Changes in XML" (2001) 26 pages.

Wong et al., "The Extended XQL for Querying and Updating Large XML Databases" DocEng'Ol (Nov. 9-10, 2001) 10 pages.

Yu et al., "Dynamically updating XML Data; Numbering Scheme Revisited," Internet and Web Information Systems, vol. 8 (2005) pp. 5-26.

"WD97: How Word for Windows Uses Temporary Files" dated Nov. 16, 2006 (6 pages) downloaded from the Internet on Jan. 28, 2011 < http://support.microsoft.com/kb/89247 >.

Kanne et al., "Efficient Storage of XML Data", dated Jun. 16, 1999, 20 pages.

Wikipedia, "SIMD", Single Instruction Multiple Instruction, dated Jan. 1, 2013, 7 pages.

Wikipedia, "In Memory Database", Dated Jan. 30, 2013, 4 pages.

W. Cockshott et al., "High-Performance Operations Using a Compressed Database Architecture", The Computer Journal, vol. 41, 1998, 14 pages.

\* cited by examiner

PARAMETERS 501

| A DESTINATION OFFSET PARAMETER THAT SPECIFIES THE BEGINNING LOCATION, WHEREIN THE BEGINNING LOCATION IS IDENTIFIED AS A NUMBER OF BYTES OFFSET FROM THE BEGINNING OF THE COMPACT BINARY FORM OF THE XML DOCUMENT |
|---|
| A CHANGED LENGTH PARAMETER THAT SPECIFIES A NUMBER OF BYTES OF THE COMPACT BINARY FORM OF THE XML DOCUMENT USED TO REPRESENT AN OLD BINARY VALUE ASSOCIATED WITH A NODE THAT IS A SUBJECT OF THE NODE INSERT OPERATION OR NODE UPDATE OPERATION, WHEREIN THE OLD BINARY VALUE IS WHAT IS REPLACED AS A RESULT OF THE NODE INSERT OPERATION OR NODE UPDATE OPERATION; |
| A NEW VALUE PARAMETER THAT REPRESENTS A NEW BINARY VALUE THAT RESULTS FROM THE NODE INSERT OPERATION OR NODE UPDATE OPERATION, WHEREIN THE NEW BINARY VALUE IS WHAT REPLACES THE OLD BINARY VALUE IN THE COMPACT BINARY FORM OF THE XML DOCUMENT |
| A NEW VALUE LENGTH PARAMETER THAT SPECIFIES A NUMBER OF BYTES TO REPRESENT THE NEW VALUE OF THE PART OF THE COMPACT BINARY FORM OF THE XML DOCUMENT |

*FIG. 5*

EFFICIENT PIECE-WISE UPDATES OF BINARY ENCODED XML DATA

FIELD OF THE INVENTION

The present invention relates generally to data management and, more specifically, to techniques for efficiently updating compact binary encoded XML data in a piece-wise manner in a relational database management system (RDBMS).

BACKGROUND

Use of the Extensible Markup Language (XML) has become a popular and useful technique for representing and exchanging information of any kind, such as exchanging information among computer program applications and services. Consequently, effective and efficient storage and manipulation of XML data has likewise become useful and necessary. Thus, some databases have been augmented to support the storage and manipulation of and access to XML data. One of the primary requirements of applications using XML as their data model is schema flexibility. However, databases for storing XML data are traditionally not optimized for schema flexibility. Although such databases may operate efficiently in a scenario in which a schema is provided and the schema is not prone to change, these databases lack adequate support for XML when the schema is prone to changes or when the schema is loosely structured.

XML data is self-descriptive (i.e., it contains tags along with data), but the standard XML serialization format is text-based, including the numbers and dates. This results in a significant increase in the size of XML documents compared to other proprietary formats for capturing the same data. The increased size of XML documents causes overhead costs during transmission, due to limited network bandwidths, as well as slower performance of storage and retrieval operations, due to limited disk I/O bandwidth. Hence, a binary encoding form for XML data was introduced which attempts to maximize schema flexibility while still providing storage and querying benefits. This binary encoding form is described in U.S. patent application Ser. No. 11/182,997 filed by Ravi Murthy et al., entitled "Encoding of Hierarchically Organized Data for Efficient Storage and Processing" ("the Murthy application"), the entire content of which is incorporated by reference in its entirety for all purposes as if fully disclosed herein.

With the encoding format described in the Murthy application, XML data is stored in a compact binary form that maintains all of the features of XML data in a useable form, such as the hierarchical structure underlying the data (e.g., the data model or infoset), the notion of elements and attributes, etc. This compact binary format significantly minimizes the overhead due to XML tags. Hence, the encoded XML is more compact than a binary representation of the corresponding textual character representation. This binary format can be processed more efficiently than parsing because the data is effectively pre-parsed.

XML documents in a database can be modified by inserting new nodes and by changing or deleting existing nodes, all of which are referred to herein collectively as an update operation. Depending on the nature of the application manipulating XML data, these types of operations can be relatively common. However, existing XML data storage systems do not provide efficient means of updating binary encoded XML documents. Such systems typically load an entire XML document into local memory (e.g., RAM) in the form of an object tree (e.g., a DOM), change the data in memory, and convert the updated DOM tree back into the binary form for storage. This process is generally inefficient and leads to scalability and performance problems because, for one reason, the entire XML document needs to be materialized in local memory. Additionally, some existing XML data storage systems might provide optimized techniques for updating XML data when there is a very specific XML schema available. However, these systems do not adequately address scenarios in which the XML schema is very unconstrained or scenarios in which there is no XML schema available.

Hence, based on the foregoing, there is a need for techniques for efficiently updating XML data stored persistently in a database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques for updating XML data stored in a database are described herein. Based on existing technology, an XML document can be represented and interpreted in a compact binary form that maintains all of the features of XML data in a useable form. This compact binary representation of XML may in turn be persistently stored (e.g., on disk) as a large object (e.g., binary large object, or BLOB). In response to a request for a modification (e.g., insert, delete or update a node) to an XML document that is stored in the compact binary form, a certain representation of the requested modification is computed for application directly to the binary form of the XML document. Thus, the requested modification can be applied directly to the persistently stored binary form without constructing an object tree (e.g., a DOM) of the XML document and/or constructing or materializing the XML document into a corresponding textual form.

The node(s) of the XML document that actually need to be changed are identified. Identifying the affected node(s) includes identifying where in the binary representation the corresponding actual changes need to be made, such as at what byte do the actual changes begin. Thus, at what byte the actual changes begin is included in the representation of the requested modification as a 'destination offset' parameter. However, if using a preferred compact binary form for XML data, identifying where in the binary representation the actual changes begin is not as straightforward as simply identifying the range or ranges of bytes in which the affected nodes or nodes are represented. This is because the preferred binary form takes advantage of known structural properties and constraints in respective XML documents, such as those that are imparted to the documents by way of corresponding XML schemas, for purposes of compacting the XML document generally via tokenization of tags and use of opcodes. For example, if the same tag is repeated multiple times, or if an XML schema constrains the order of elements, then corresponding token IDs can be avoided using the preferred binary form. Thus, computing where in the binary representation the corresponding actual changes need to be made may take into account the nature of the compact binary form in which the XML document is encoded. Refer to the Murthy application for greater detail regarding the preferred, non-limiting example of a compact binary form of encoding XML data.

In addition to the destination offset parameter, enough information is included in the representation of the requested modification to be able to interleave the actual changes directly into the binary form of the XML document. For example, certain sets of bytes corresponding to respective updated nodes can be changed, added, or deleted without overwriting the entire XML document.

Operating Environment-Storage System

A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using XPath and the XQuery query language) or a relational-centric (e.g., using the SQL query language) manner. Such a repository is at times referred to as an XML repository or an XML database (i.e., "XDB").

Updating XML Documents

XML documents can be modified by inserting, updating, and/or deleting XML nodes in the documents. A request for a modification to an XML document can be expressed by identifying the XML document, identifying the node(s) to be changed with an XPath or other pathname expression, and providing a new value, if applicable. The set of operations that may be requested are as follows.

(1) Adding new nodes: a user can identify a target node or the parent node by means of an XPath or other pathname expression, and specify the value for the child node to be inserted. The location within an XML document at which a new node is inserted can be identified, for example, by identifying a target node before which the new node is inserted (e.g., insertChild( ) command) or by identifying a parent node and providing the child node to be inserted as the last child of the identified parent node (e.g., appendChild( ) command).

(2) Updating existing nodes: a user can identify the target node by means of an XPath or other pathname expression, and specify the new value for the target node to be updated.

(3) Deleting nodes: a user can identify the target node for deletion by means of an XPath or other pathname expression.

As discussed, traditional XML storage systems typically load the whole XML document into local memory to perform the requested operation. However, this is an inefficient process that results in slow performance. Therefore, according to one embodiment, a stored compact binary representation of the XML document is updated directly based on an XML data modification request. In other words, the XML document may be updated directly on persistent storage (i.e., non-volatile memory, such as disk) without loading the document into local volatile memory. Alternatively, the XML document may be loaded into local volatile memory for updating, but in the compact binary representation rather than as an object tree, where the compact binary representation is more compact than simply representing the textual XML in binary format (see, e.g., the Murthy application).

An Efficient Process for Updating XML Documents Stored in a Database

As mentioned before, a certain representation of a change to an XML document is computed for application directly to a compact binary form of the XML document. According to an embodiment, such a change is represented by a set of parameter values, referred to herein as a "change tuple." Generally, FIG. 1 is a flow diagram depicting a process for generating a change tuple.

Figure 1:
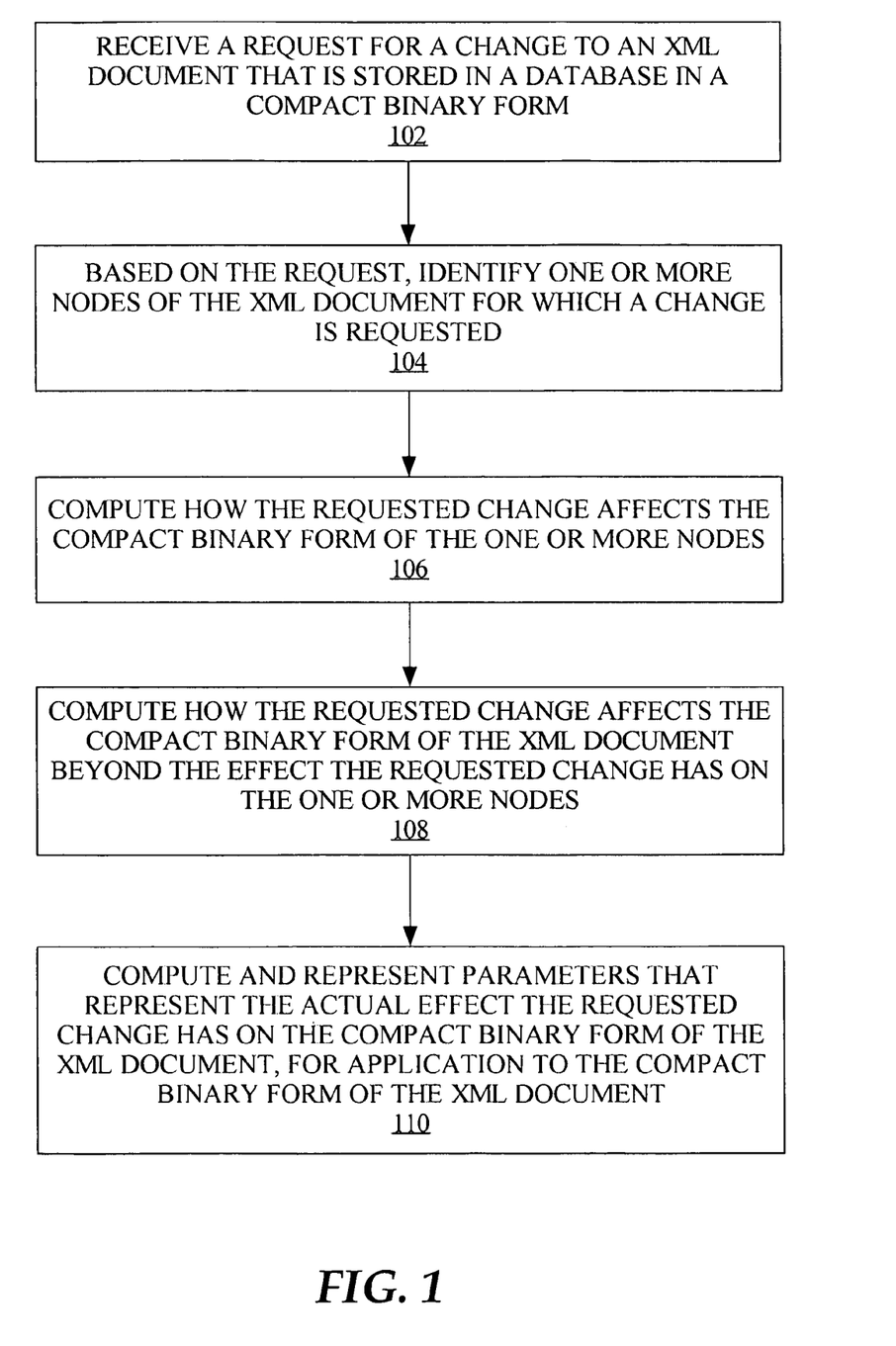
FIG. 1 is a flow diagram that illustrates a process for generating a change tuple corresponding to a requested modification to an XML document that is stored persistently in a compact binary form in a database, according to an embodiment of the invention.

FIG. 1 is a flow diagram that illustrates a process for generating a change tuple corresponding to a requested modification to an XML document that is stored persistently in a compact binary form in a database, according to an embodiment of the invention. The method illustrated in FIG. 1 may be performed by executing one or more sequences of instructions by one or more processors, such as within a computer system (e.g., computer system 300 of FIG. 3).

At block 102, a request for a modification to an XML document is received, in the context of an XML document that is stored in a database in a compact binary form. For example, a SQL or SQL/XML statement is received at a database server in a database system that supports storage and management of XML data. Such a statement typically identifies (a) an XML document to be updated; (b) one or more pathnames, within the identified XML document, to nodes being updated (e.g., XPaths); and (c) new values for the corresponding nodes being updated.

At block 104, one or more nodes for which a modification is requested in the XML document are identified based on the modification request. Various approaches to locating XML data stored in a database may be used to identify the affected nodes based on the pathname specified in the modification request. Non-limiting examples of approaches to locating XML data stored in a database include the use of XML indexes, streaming XPath evaluation (e.g., nondeterministic finite state automation, or NFA), and the like. Furthermore, the compact binary form in which the XML document is stored in persistent storage may ultimately be a binary large object (BLOB). In such a scenario, block 104 may include identifying the exact location within the BLOB at which the affected node or nodes are represented in the serialized binary form.

At block 106, how the requested modification affects the compact binary form of the one or more nodes is computed. For example, if a node value is changed from "1" to "1000", how to represent "1000" in the compact binary form is computed. For another example, if a node value is changed from an integer type "1" to a float type "1000", how to represent the float "1000" in the compact binary form is computed because the compact binary form may store values in their native datatype, as described in the Murthy application. According to one embodiment, the "new value" for the one or more nodes, as represented in the compact binary form, is computed and represented as a parameter in a certain representation (e.g., a change tuple) of the requested modification to the XML document, such as at block 110. According to one embodiment, the new value takes into account any effects the requested modification has on the compact binary form beyond the direct effect the requested modification has on the identified one or more nodes, as described in greater detail hereafter. Hence, the new value represents the net set of bytes inserted into the byte string of the compact binary form to replace the old value.

Furthermore, a representation of "1000" will likely require more bytes than a representation of "1", thus, a "new value length" may be computed as part of block 106. According to one embodiment, the new value length for the one or more nodes is computed and represented as a parameter in the change tuple corresponding to the requested modification to the XML document, such as at block 110. According to one embodiment, the new value length takes into account any effects the requested modification has on the compact binary form beyond the direct effect the requested modification has on the identified one or more nodes, as described in greater detail hereafter.

For an XML document that is stored in a compact binary form (i.e., not a simple binary representation of the character-based XML content), a change to one node may affect the compact binary representation beyond the direct effect on that one node. For example, the Murthy application describes a technique referred to as "array mode optimization," whereby if the same tag is repeated multiple times, corresponding token IDs are not repeated. Thus, addition or deletion of a node could affect the tag sequence and, therefore, affect the array mode optimization component of the compact binary encoding scheme. For another example, the Murthy application describes a technique referred to as "schema sequential optimization," whereby if structure related metadata (e.g., an XML schema) constrains the order of elements to be in a specific order, token IDs can be avoided within the encoding due to exploitation of the XML data model. Thus, a change to an XML schema (e.g., via a DDL operation) could provoke a corresponding change to an XML document in order to remain conforming to the schema. This change to the XML schema and the resultant change to a corresponding XML document could ultimately affect the order of elements within the document and, therefore, the schema sequential optimization component of the compact binary encoding scheme.

Hence, at block 108, how the requested modification affects the compact binary form of the XML document beyond the effect the requested modification has on the one or more identified nodes is computed. According to one embodiment, this entire net effect on the compact binary form for a particular requested modification is represented as the "new value" for insertion into the compact binary form. Hence, the new value for the entire effect on the compact binary form for a particular requested modification is computed and represented as a parameter in the change tuple corresponding to the requested modification, such as at block 110. Similarly, this entire effect on the compact binary form is represented in the corresponding "new value length" parameter in the change tuple corresponding to the requested modification, such as at block 110. Stated otherwise, the direct effect and the indirect effect, if any, that the requested modification has on the compact binary form are computed and represented together in the corresponding change tuple as corresponding parameters: new value and new value length.

Expressing the Effect of the Requested Modification

At block 110, parameters that represent the actual effect the requested modification has on the compact binary form of the XML document are computed and represented, such as in a corresponding change tuple. In turn, this change tuple can be applied to the compact binary form of the XML document stored persistently in the database, or locally in volatile memory. According to one embodiment, the effect that the requested modification has on the compact binary form of the XML document is expressed in the form of the following change tuple: <destOffset, changedLen, newValue, newValueLen>. The names used to refer to the foregoing change tuple parameters may vary from implementation to implementation. Hence, the components of the change tuple are not limited to the foregoing parameter names.

Note that the nature of a BLOB may vary from implementation to implementation. Thus, some types of BLOBs in which the compact binary representation of the XML document is stored are able to be inserted into and deleted from, whereas other types of BLOBs are not. Stated otherwise, some BLOBs allow for inserting or deleting a group of contiguous bytes anywhere within the BLOB without necessarily having to rewrite the remainder of bytes to the end. By contrast, some BLOBs do not allow inserting or deleting a group of contiguous bytes without overwriting the entire BLOB after the starting insertion/deletion point. Regardless of the nature of the BLOB, the techniques described herein can account for the characteristics of the BLOB when computing change tuple parameters.

Figure 2:
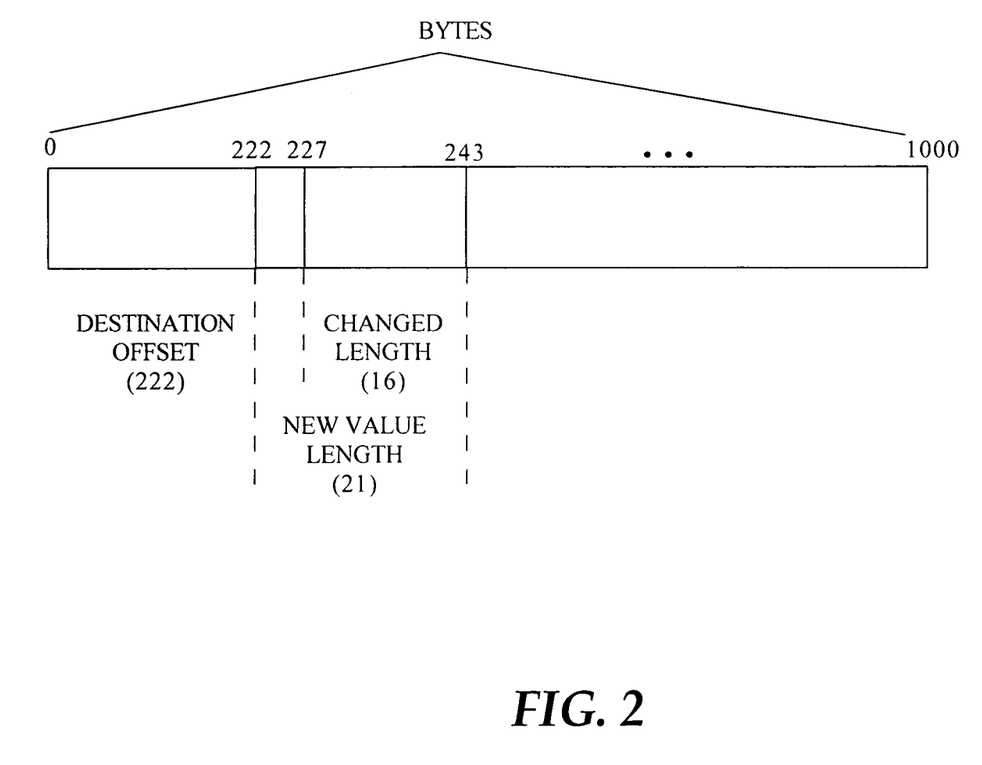
FIG. 2 is a diagram illustrating an example of how an update to compact binary encoded XML data is expressed in a corresponding change tuple, according to an embodiment of the invention.

FIG. 2 is a diagram illustrating an example of how an update to compact binary encoded XML data is expressed in a corresponding change tuple, according to an embodiment of the invention.

The parameter "destOffset" (destination offset) is used to express the point, in the compact binary form, at which the effect of the requested modification begins. Thus, the destination offset identifies, for at least the first atomic node (as appearing in the binary form) being updated via the requested modification, the offset location within the compact binary form at which the requested modification begins. According to one embodiment, the destination offset is represented as a number of bytes from the beginning of the compact binary form. As discussed, the destination offset may not be the actual starting location of an identified node directly affected by the requested modification. Rather, the destination offset identifies the beginning location of the actual change to the compact binary form, with consideration to the nature of the compact binary form. For example, the actual effect of the requested modification on the binary form may begin at a location before the location of the node value in the binary form.

For the example shown in FIG. 2, assume that only one node is being updated and that the old value of that node is represented in the compact binary form with sixteen bytes, i.e., from bytes 227-243. Assume further that the tag name for the updated node is changed, resulting in a change to the associated array mode optimization component of the compact binary encoding scheme, e.g., a series of five consecutive <lineItem> tags is disrupted by changing the fifth <lineItem> tag to some other tag at the same location in the corresponding XML hierarchy. Therefore, the change to this node has an impact on the compact binary form beyond just the node being changed, i.e., some bytes before the node need to be changed to reflect the change in array mode optimization. Because of this effect on other bytes, the net effect on the binary form actually begins at byte 222 rather than byte 227. Thus, the destination offset for this update is 222, which indicates that the change to the binary form begins at byte 222 of the byte string.

The parameter "changedLen" (changed length) is used to express the length of the changed, or old, value of the updated node in its compact binary form. It is noted above that in this example the old value of that node is represented in the compact binary form with sixteen bytes. Thus, the changed length for this update is 16 bytes.

The parameter "newValue" (new value) is used to express the new value of the entire change to the compact binary form because of the node update, where the new value is expressed in its corresponding compact binary form and includes any effect on the binary form beyond the updated node. The parameter "newValueLen" (new value length) is used to express the length in bytes of the new value of the entire change to the compact binary form because of the node update, where the new value is expressed in its corresponding compact binary form. Thus, the new value length for this update is 21 bytes, i.e., from destination offset byte 222 to the end of the node at byte 243. In this example, a string of bytes representing the old node value, which was expressed with 16 bytes, is replaced with a new string of 21 bytes representing the new node value and this node value's effect on the rest of the binary form.

A single user update operation might result in multiple change tuples based on the number of nodes being identified by the XPath in the modification request. According to one embodiment, these sets of change tuples are represented in an XML change document referred to herein as "atom-diff-XML," where the "atom" here refers to a primitive change operation. As discussed, the "atom-diff-XML", which represents the changes to the compact binary form resulting from a modification request, can be applied to the base storage based on the corresponding storage capabilities. For example, if the storage supports piece-wise updates, the primitive change operations represented in the atom-diff-XML are translated directly to the underlying base storage construct. If the storage only supports overwriting capabilities (without the ability to increase/decrease lengths), the overall requested changes represented in the atom-diff-XML are applied to the underlying base storage construct by overwriting everything past the first change (based on the document order).

In addition to a node update operation, as with the example described in reference to FIG. 2, a node may be inserted or deleted. Inserting a new node into an XML document adds bytes to the compact binary form. The destination offset identifies where in the byte string the new node is inserted, taking into consideration the new node's effect, if any, on surrounding nodes and the surrounding nodes' corresponding binary representation. Similarly, the new value and new value length corresponding to the node insert operation take into account the new node and the new node's entire effect on the compact binary representation. Even though a new node is being added, there may be a corresponding value for the changed length parameter (the 'old' length) because the new node may affect the compact binary representation of surrounding nodes. Thus, the changed length parameter in such a scenario would represent the old representation of any surrounding nodes that are affected by the insertion of the new node, if any. Likewise, deleting a node from an XML document may replace x number of bytes with y number of bytes, because deleting the node may have an affect on the binary representation of other nodes, whose new binary representation would consist of the y bytes. In summary, whether updating, deleting, or adding a node to an XML document, the values for the change tuple reflect the change to the node as well as the effect the node change has on the compact binary representation of other nodes, if any.

Hence, techniques are described for applying user update statements without materializing the entire target XML document in memory as a DOM tree, thereby improving the performance and scalability in comparison with other techniques.

Hardware Overview

Figure 3:
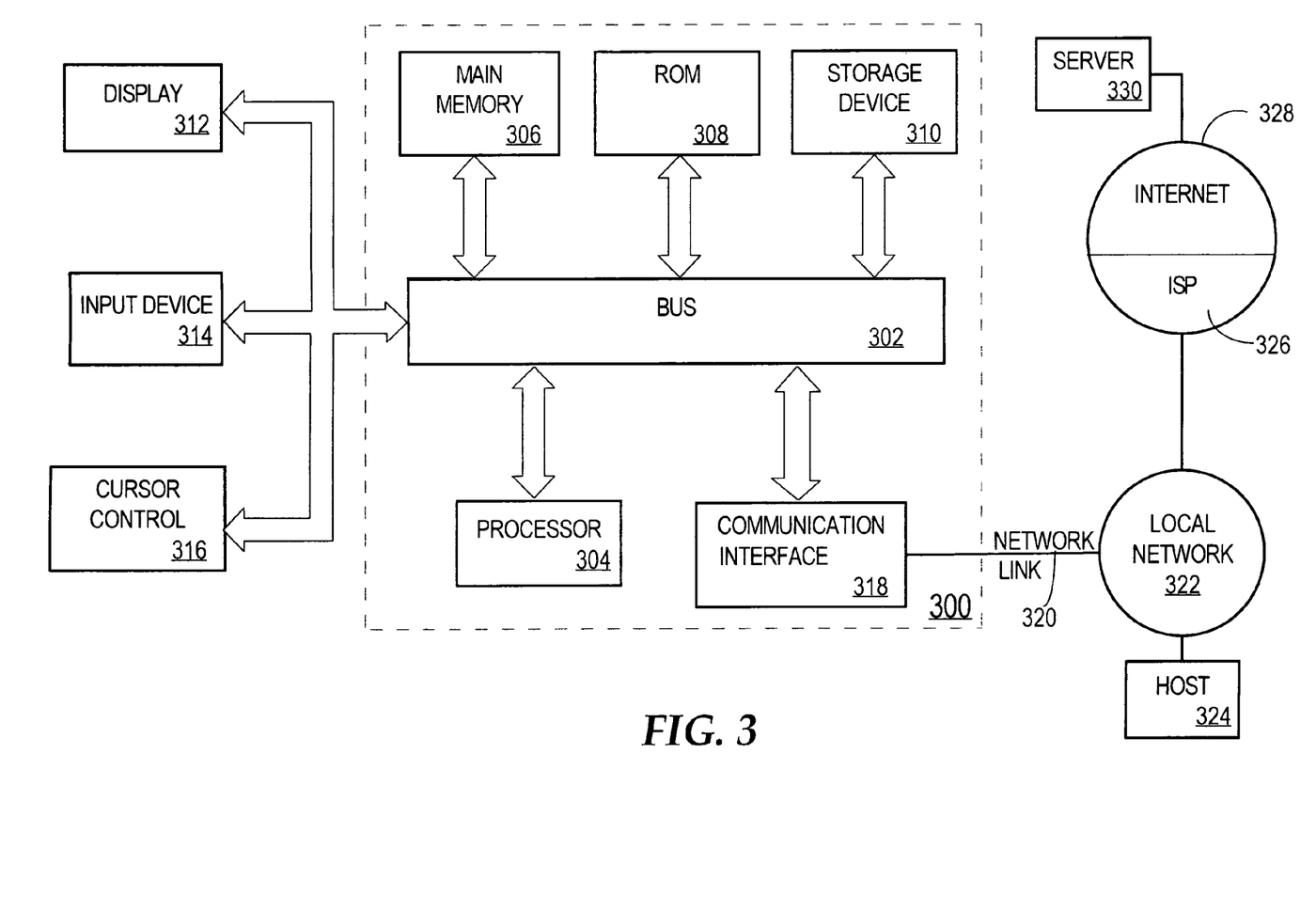
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Technique for Piece-Wise Modification of an XML Document

Figure 4:
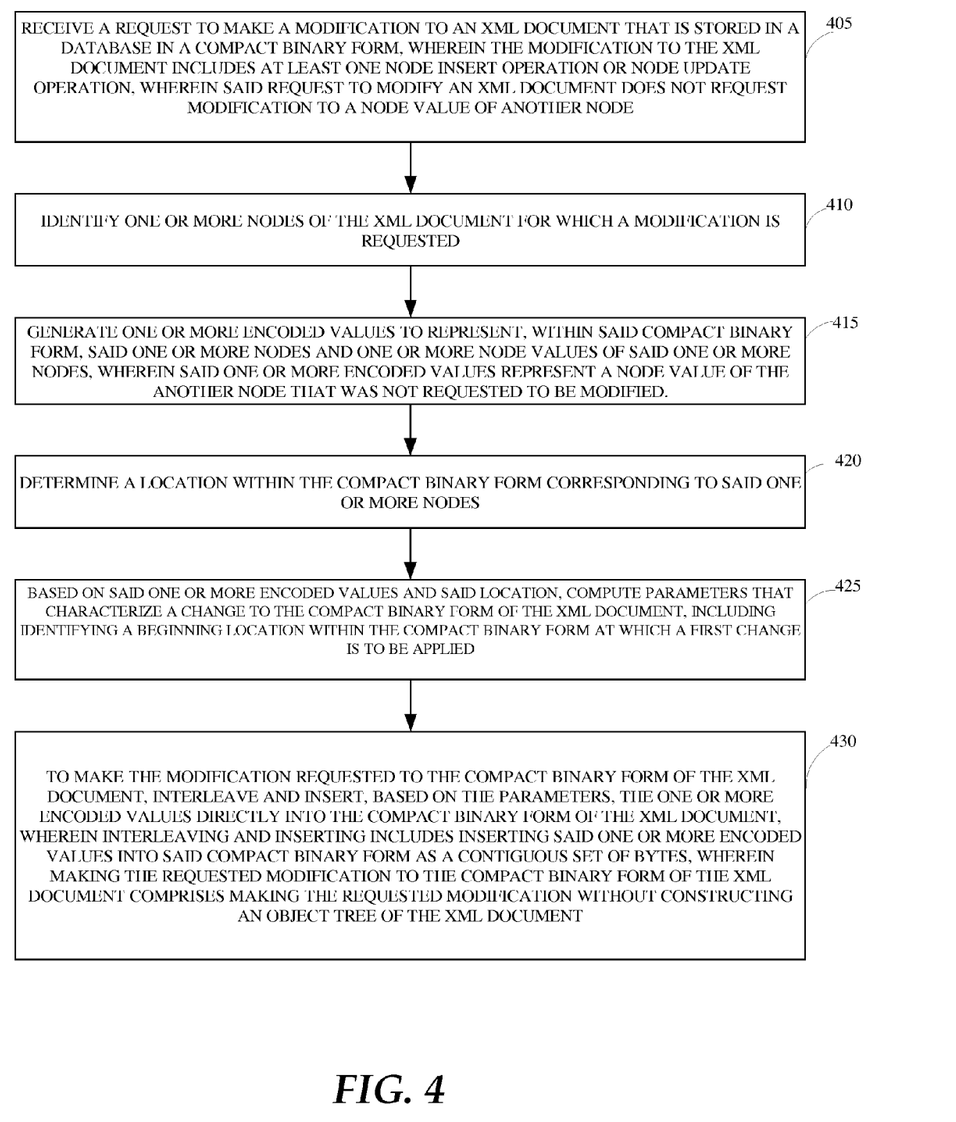
FIG. 4 is a diagram depicting a procedure piece-wise modification of an XML document according to an embodiment of the present invention.

FIG. 4 depicts a procedure for piece-wise modification of an XML document according to an embodiment of the present invention. The procedure depicted in FIG. 4 is illustrative and not limiting of any embodiment of the present invention.

At 405, the procedure receives a request to make a modification to an XML document that is stored in a database in a compact binary form, wherein the modification to the XML document includes at least one node insert operation or node update operation, wherein said request to modify an XML document does not request modification to a node value of another node.

At 410, the procedure identifies one or more nodes of the XML document for which a modification is requested.

At 415, the procedure generates one or more encoded values to represent, within said compact binary form, said one or more nodes and one or more node values of said one or more nodes, wherein said one or more encoded values represent a node value of the another node that was not requested to be modified.

At 420, the procedure determines a location within the compact binary form corresponding to said one or more nodes.

At 425, the procedure determines, based on said one or more encoded values and said location, compute parameters that characterize a change to the compact binary form of the XML document, including identifying a beginning location within the compact binary form at which a first change is to be applied.

At 430, to make the modification requested to the compact binary form of the XML document, the procedure interleaves and inserts, based on the parameters, the one or more encoded values directly into the compact binary form of the XML document without overwriting the entirety of the compact binary form, wherein interleaving and inserting includes inserting said one or more encoded values into said compact binary form as a contiguous set of bytes, wherein making the requested modification to the compact binary form of the XML document comprises making the requested modification without constructing an object tree of the XML document.

Figure 5:
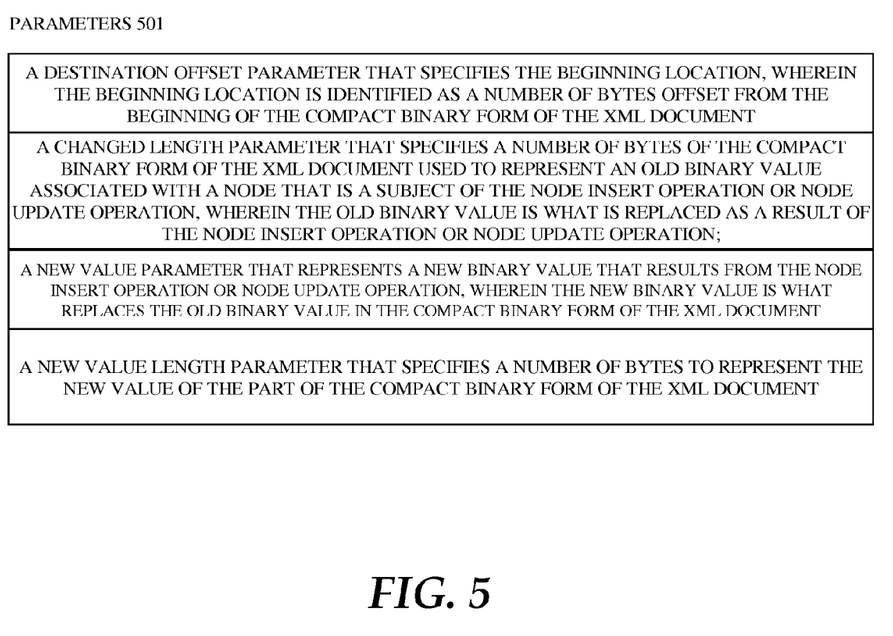
FIG. 5 is a diagram depicting parameters 501 that characterize a change to a compact binary form of the XML document.

FIG. 5 shows parameters 501 that characterize a change to the compact binary form of the XML document, according to an embodiment of the present invention. Parameters 501 include (1) a destination offset parameter that specifies the beginning location, wherein the beginning location is identified as a number of bytes offset from the beginning of the compact binary form of the XML document; (2) a changed length parameter that specifies a number of bytes of the compact binary form of the XML document used to represent an old binary value associated with a node that is a subject of the node insert operation or node update operation, wherein the old binary value is what is replaced as a result of the node insert operation or node update operation; (3) a new value parameter that represents a new binary value that results from the node insert operation or node update operation, wherein the new binary value is what replaces the old binary value in the compact binary form of the XML document; and (4) a new value length parameter that specifies a number of bytes to represent the new value of the part of the compact binary form of the XML document.

What is claimed is:

1. A computer-implemented method comprising:
   receiving a request to make a modification to an XML document that is stored in a compact binary form, said request specifying to modify a set of one or more nodes;
   in response to said request:
      identifying a first node of the XML document for which a particular modification is requested;
      generating one or more first encoded values to represent, within said compact binary form, said first node according to said particular modification requested;
      generating one or more second encoded values to represent, within said compact binary form, a second node of the XML document, wherein the request does not request to modify the second node in the XML document, wherein said particular modification of the first node causes a change in a representation of the second node within said compact binary form because the first node and the second node are consecutive nodes within said XML document and have an identical tag name in a character form, wherein the tag name of said first node and the tag name of said second node are together replaced, within said compact binary form, by a single token id followed by an opcode, said single token id being a value different than said tag name of said first node and different than said opcode, said opcode specifying that a respective node for said opcode has a tag name that is identical to a tag name of a previous node;
      based on said one or more first and second encoded values, computing parameters that characterize a change to the compact binary form of the XML document;
      inserting, based on the parameters, the one or more first and second encoded values directly into the compact binary form of the XML document; and
   wherein the method is performed by one or more computer systems.

2. The method of claim 1, wherein computing the parameters includes identifying a beginning location within the compact binary form at which said change is to be applied.

3. The method of claim 2, wherein computing the parameters comprises computing:
   a destination offset parameter that represents the beginning location, wherein the beginning location is identified as a number of bytes offset from a beginning of the compact binary form of the XML document.

4. The method of claim 1, wherein the particular modification includes at least one node insert operation or node update operation, and wherein computing the parameters comprises:
a destination offset parameter that specifies a beginning location, wherein the beginning location is identified as a number of bytes offset from a beginning of the compact binary form of the XML, document;
a changed length parameter that specifies a number of bytes of the compact binary form of the XML document used to represent an old binary value associated with a node that is a subject of the node insert operation or node update operation, wherein the old binary value is what is replaced as a result of the node insert operation or node update operation;
a new value parameter that represents a new binary value that results from the node insert operation or node update operation, wherein the new binary value is what replaces the old binary value in the compact binary form of the XML document; and
a new value length parameter that specifies a number of bytes to represent the new binary value in the compact binary form of the XML document.

5. The method of claim 4, wherein inserting, based on the parameters, the one or more first and second encoded values directly into the compact binary form of the XML document includes replacing the old binary value with the new binary value beginning at the beginning location.

6. The method of claim 1, wherein said second node is not a descendant of said first node.

7. A non-transitory machine-readable medium storing one or more sequences of instructions which, when executed by one or more processors, causes the one or more processors to perform steps comprising:
receiving a request to make a modification to an XML document that is stored in a compact binary form, said request specifying to modify a set of one or more nodes;
in response to said request:
identifying a first node of the XML document for which a particular modification is requested;
generating one or more first encoded values to represent, within said compact binary form, said first node according to said particular modification requested;
generating one or more second encoded values to represent, within said compact binary form, a second node of the XML document, wherein the request does not request to modify the second node in the XML document, wherein said particular modification of the first node causes a change in a representation of the second node within said compact binary form because the first node and the second node are consecutive nodes within said XML document and have an identical tag name in a character form, wherein the tag name of said first node and the tag name of said second node are together replaced, within said compact binary form, by a single token id followed by an opcode, said single token id being a value different than said tag name of said first node and different than said opcode, said opcode specifying that a respective node for said opcode has a tag name that is identical to a tag name of a previous node;
based on said one or more first and second encoded values, computing parameters that characterize a change to the compact binary form of the XML document; and
inserting, based on the parameters, the one or more first and second encoded values directly into the compact binary form of the XML document.

8. The machine-readable medium of claim 7, wherein computing the parameters includes identifying a beginning location within the compact binary form at which said change is to be applied.

9. The machine-readable medium of claim 8, wherein computing the parameters comprises computing:
a destination offset parameter that represents the beginning location, wherein the beginning location is identified as a number of bytes offset from a beginning of the compact binary form of the XML document.

10. The machine-readable medium of claim 8, wherein the particular modification to the XML document includes at least one node insert operation or node update operation, and wherein computing the parameters comprises:
a destination offset parameter that specifies a beginning location, wherein the beginning location is identified as a number of bytes offset from a beginning of the compact binary form of the XML document;
a changed length parameter that specifies a number of bytes of the compact binary form of the XML document used to represent an old binary value associated with a node that is a subject of the node insert operation or node update operation, wherein the old binary value is what is replaced as a result of the node insert operation or node update operation;
a new value parameter that represents a new binary value that results from the node insert operation or node update operation, wherein the new binary value is what replaces the old binary value in the compact binary form of the XML document; and
a new value length parameter that specifies a number of bytes to represent the new binary value in the compact binary form of the XML document.

11. The machine-readable medium of claim 7, wherein making the requested modification to the compact binary form of the XML document comprises making the requested modification without constructing an object tree of the XML document.

12. The machine-readable medium of claim 7, wherein said second node is not a descendant of said first node.

* * * * *

UNITED STATES PATENT AND TRADEMARK OFFICE
CERTIFICATE OF CORRECTION

PATENT NO. : 9,460,064 B2
APPLICATION NO. : 11/437512
DATED : October 4, 2016
INVENTOR(S) : Chandrasekar et al.

It is certified that error appears in the above-identified patent and that said Letters Patent is hereby corrected as shown below:

On page 2, Column 2, under Other Publications, Line 21, delete "Pulished" and insert -- Published --, therefor.

In Column 12, Line 42, in Claim 1, delete "replaced," and insert -- replaced --, therefor.

In Column 13, Line 8, in Claim 4, delete "XML," and insert -- XML --, therefor.

Signed and Sealed this
Sixth Day of June, 2017

Michelle K. Lee
*Director of the United States Patent and Trademark Office*